US012158121B2

(12) United States Patent
Loetz

(10) Patent No.: US 12,158,121 B2
(45) Date of Patent: Dec. 3, 2024

(54) ENGINE SYSTEM CONFIGURED FOR UNBURNED HYDROCARBON (HC) COLLECTION FROM EXHAUST PORT

(71) Applicant: Caterpillar Inc., Peoria, IL (US)

(72) Inventor: Andrew Joseph Loetz, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 7 days.

(21) Appl. No.: 17/894,768

(22) Filed: Aug. 24, 2022

(65) Prior Publication Data

US 2024/0068425 A1 Feb. 29, 2024

(51) Int. Cl.

| | |
|---|---|
| ***F02F 1/42*** | (2006.01) |
| ***F02F 1/36*** | (2006.01) |
| ***F02M 26/35*** | (2016.01) |
| ***F02M 26/41*** | (2016.01) |

(52) U.S. Cl.

CPC .............. *F02F 1/4264* (2013.01); *F02F 1/36* (2013.01); *F02M 26/35* (2016.02); *F02M 26/41* (2016.02); *F02F 2001/4278* (2013.01); *F02F 2200/06* (2013.01)

(58) Field of Classification Search

CPC .... F02F 1/4264; F02F 1/36; F02F 2001/4278; F02F 2200/06; F02M 26/35; F02M 26/41; F02D 41/0007; F02D 41/0047

See application file for complete search history.

(56) References Cited

U.S. PATENT DOCUMENTS

| | | | |
|---|---|---|---|
| 3,915,134 A | 10/1975 | Young et al. | |
| 4,075,994 A | 2/1978 | Mayer et al. | |
| 4,644,926 A | 2/1987 | Sakurai et al. | |
| 7,673,447 B2 | 3/2010 | Gaiser | |
| 8,137,648 B2 | 3/2012 | Jen et al. | |
| 9,897,021 B2 | 2/2018 | Bizub et al. | |
| 10,428,707 B2 | 10/2019 | Fritz et al. | |
| 10,502,109 B2 | 12/2019 | Cummins | |
| 10,704,505 B2 * | 7/2020 | Springer | F01N 3/101 |
| 2003/0154713 A1 | 8/2003 | Hiratsuka et al. | |
| 2003/0192502 A1 * | 10/2003 | Joos | F01N 3/34 123/193.5 |
| 2011/0000470 A1 * | 1/2011 | Roth | F02M 26/07 123/90.15 |
| 2011/0138766 A1 | 6/2011 | ELKady et al. | |
| 2014/0144413 A1 | 5/2014 | Pierik et al. | |
| 2019/0321782 A1 | 10/2019 | Gabrielsson | |

* cited by examiner

*Primary Examiner* — Grant Moubry
(74) *Attorney, Agent, or Firm* — Brannon Sowers & Cracraft PC

(57) ABSTRACT

An engine system includes a cylinder block, and a cylinder head attached to the cylinder block and including exhaust ports. Exhaust collection passages are formed in the cylinder head and each fluidly connect to one of the exhaust ports. An unburned hydrocarbon (UHC) emissions mitigation conduit fluidly connects to the exhaust ports to route UHC to an oxidation catalyst or for recirculation.

15 Claims, 5 Drawing Sheets

ENGINE SYSTEM CONFIGURED FOR UNBURNED HYDROCARBON (HC) COLLECTION FROM EXHAUST PORT

TECHNICAL FIELD

The present disclosure relates generally to emissions mitigation in an internal combustion engine system, and more particularly to collecting exhaust containing unburned hydrocarbons from an exhaust port in an engine.

BACKGROUND

Internal combustion engines are used globally for diverse purposes ranging from electric power generation to vehicle propulsion, operation of pumps and compressor, and in still other applications. In a typical arrangement, a fuel is admitted with air into cylinders in the engine and ignited to cause a controlled combustion reaction that drives pistons in the cylinders coupled to a crankshaft. A wide range of fuel types have been used in internal combustion engines over the years, ranging from gasoline, diesel, to various gaseous fuels such as natural gas or other gaseous hydrocarbon fuels and blends thereof.

Gaseous fuels continue to attract engineering resources, given the lower levels of certain emissions that tend to be produced. Gaseous fuels, for example, tend to produce few emissions of particulate matter. More recently, increased interest has been given to exploitation of gaseous hydrogen fuels such as gaseous molecular hydrogen.

It is generally desirable to burn as high a proportion of a fuel admitted into in an engine as is practicable. Where less than all of the fuel is burned, efficiency penalties are observed if otherwise utilizable fuel is discharged in exhaust from the engine. Moreover, the discharge of the unburned fuel can be considered objectionable given that certain unburned fuels are considered to be so-called greenhouse gases or "GHG." Unburned hydrocarbon emissions can be observed in any engine but may be especially undesirable in gaseous fuel engines where the fuel includes at least some methane.

Various strategies are known for mitigating unburned hydrocarbon emissions, including by way of conventional exhaust gas recirculation where exhaust containing unburned hydrocarbons is recirculated to an intake system for the engine. Other efforts attempt to minimize unburned hydrocarbons by way of the conditions of the combustion itself. One known strategy apparently associated with reduced amounts of unburned hydrocarbons in-cylinder is set forth in United States Patent Application Publication No. 20120227387 to Willi. The art provides ample room for improvement and development of alternative strategies.

SUMMARY

In one aspect, an engine system includes an engine having a cylinder block with a plurality of cylinders formed therein, a cylinder head attached to the cylinder block and having a plurality of intake ports and a plurality of exhaust ports, and an intake manifold and an exhaust manifold each attached to the cylinder block. The cylinder head further has formed therein a plurality of exhaust collection passages each fluidly connected to one of the plurality of exhaust ports at an unburned hydrocarbon (UHC) collection location. The engine system further includes an exhaust conduit fluidly connected to the exhaust manifold, and a UHC emissions mitigation conduit fluidly connected to the plurality of exhaust collection passages.

In another aspect, a cylinder head for an engine includes a cylinder head casting having formed therein a coolant cavity extending between an upper deck having an upper deck surface, and a lower deck having a lower deck surface. The cylinder head casting further includes an intake port extending through the coolant cavity to an intake opening in the lower deck forming an intake valve seat, and an exhaust port extending through the coolant cavity from an exhaust opening in the lower deck forming an exhaust valve seat to an exhaust manifold feed opening. The cylinder head casting further has formed therein an exhaust collection passage fluidly connected to the exhaust port at an unburned hydrocarbon (UHC) collection location vertically between the upper deck and the lower deck, and fluidly between the exhaust valve seat and manifold feed opening.

In still another aspect, a method of operating an engine system includes combusting a gaseous fuel containing gaseous hydrocarbon (HC) and air in a cylinder in an engine, and moving a piston in an exhaust stroke toward a top dead center position in the cylinder. The method further includes conveying exhaust expelled from the cylinder via the moving of the piston through an exhaust port to an exhaust manifold while an exhaust valve of the engine is open, and collecting exhaust directly from the exhaust port while the exhaust valve is closed via an exhaust collection passage extending through a cylinder head forming the exhaust port. The method further includes oxidizing unburned hydrocarbon (UHC) in the collected exhaust.

DETAILED DESCRIPTION

Figure 1:
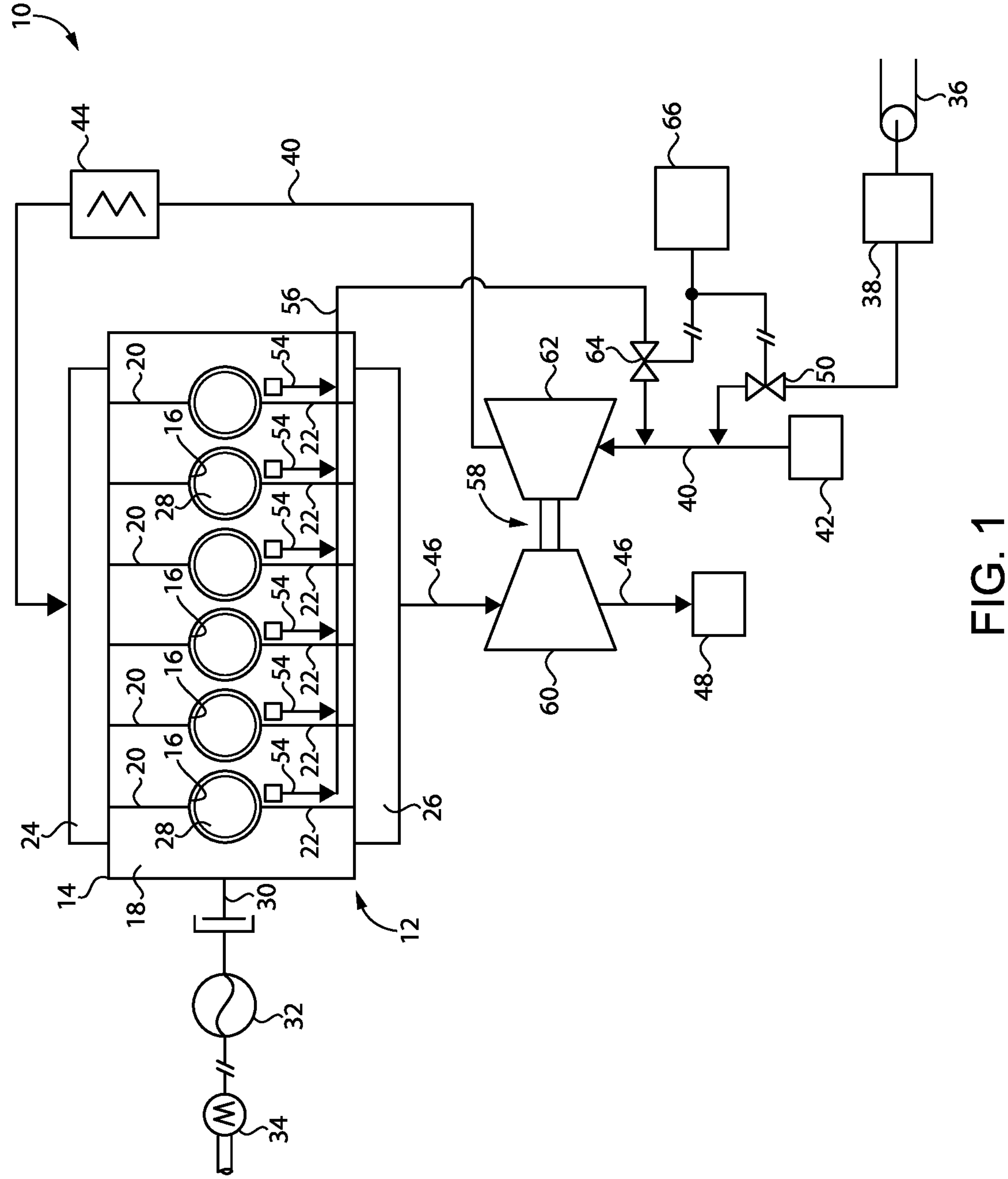
FIG. 1 is a diagrammatic view of an engine system, according to one embodiment.

Referring to FIG. 1, there is shown an internal combustion engine system 10, according to one embodiment. Engine system 10 includes an internal combustion engine 12 having a cylinder block 14 with a plurality of cylinders 16 formed therein. Cylinders 16 can include any number, in any suitable arrangement such as an inline pattern, a V-pattern, or still another. Engine 12 also includes a cylinder head 18 attached to cylinder block 14. A plurality of pistons 28 are positioned each within one of cylinders 16 and movable in cylinder block 14 between a top dead center position and a bottom dead center position, typically in a conventional four-stroke engine cycle. Pistons 28 are coupled to a driveshaft 30 rotatable to power a load 32. Load 32 may include an electrical generator structured to power an electric motor 34. An electrical generator operated via engine system 10 could also provide electrical power to a local or a regional electrical grid. In still other instances, engine system 10 could be used for vehicle propulsion, operating a pump, a compressor, or still another device.

Engine system 10 also includes a fuel supply 36. Fuel supply 36 may include a line gas supply receiving a feed of a gaseous fuel from a gas field or a stored gaseous fuel supply, for example. Gaseous fuels used in engine system 10 may include natural gas (NG), methane, ethane, various blends of gaseous hydrocarbon fuel (HC), or still others. In some embodiments engine system 10 can be operated on a blend of HC and a gaseous hydrogen fuel such as gaseous molecular hydrogen. Engine system 10 could also be a dual fuel engine utilizing pilot injections of a liquid fuel such as a compression-ignition diesel fuel that ignite a larger charge of a gaseous fuel in a cylinder. In an implementation engine 12 is spark-ignited and each of cylinders 16 equipped with a spark ignition device, such as a prechamber sparkplug.

A filter 38 or other processing equipment receives a flow of gaseous fuel from fuel supply 36, which is conveyed to a fuel admission valve 50. Fuel admission valve 50 admits gaseous fuel to an intake conduit 40 receiving a feed of intake air from a filtered air inlet 42. Engine system 10 also includes a turbocharger 58 including a turbine 62 within intake conduit 40. A mixture of air and fuel is pressurized by way of compressor 62 and conveyed through intake conduit 40 to an intake manifold 24 attached to a cylinder head 18, typically passing through an aftercooler 44. Engine 12 also includes an exhaust manifold 26 attached to cylinder head 18, and an engine exhaust conduit 46 fluidly connected to exhaust manifold 26 and to an exhaust outlet 48. A turbine 60 of turbocharger 58 is within exhaust conduit 46 and rotated by way of a flow of exhaust to operate compressor 62. In the illustrated embodiment, fuel is delivered to engine 12 by way of fumigation. In other embodiments fuel could be port-injected, direct-injected, delivered by a combination of direct injection or port injection and fumigation, or by still another strategy such as intake manifold injection.

Cylinder head 18 is attached to cylinder block 14 and includes a plurality of intake ports 20 and a plurality of exhaust ports 22 each connected to a respective one of cylinders 16 to convey intake air and fuel, and exhaust, respectively, in a generally known manner. Cylinder head 18 further has formed therein a plurality of exhaust collection passages 54 each fluidly connected to one of the plurality of exhaust ports 22 at an unburned hydrocarbon (UHC) collection location. Collecting exhaust at locations where the exhaust is relatively rich in UHC compared to exhaust collected at other locations, as further discussed therein, can assist in mitigating UHC emissions according to a number of different strategies.

To this end, engine system further includes a UHC emissions mitigation conduit 56 fluidly connected to the plurality of exhaust collection passages 54. In the illustrated embodiment, UHC emissions mitigation conduit 56 fluidly connects to intake conduit 40 at a location fluidly upstream of compressor 62. Upstream means away from engine 12 and toward filtered air inlet 42. In some embodiments engine system 10 may also include an electrically actuated valve 64 within UHC emissions mitigation conduit 56 and movable between an open position, and a closed position. Engine system 10 may also include an electronic control unit 66 in control communication with valve 64, and also in control communication with fuel admission valve 50.

Valve 64 can enable selective recirculation of exhaust rich in UHC to compressor 62 for returning to engine 12 to be combusted in cylinders 16. In some embodiments, an electrically actuated valve may not be used, and instead fluid connection between exhaust collection passages and an intake conduit, or an exhaust conduit as described in connection with other embodiments, may be continuous. Some back pressure of outgoing exhaust may be continuously present while engine 12 is running, thus enabling collected exhaust to flow more or less continuously. Moreover, embodiments are contemplated where collected exhaust is returned at a different location than that specifically illustrated, such as at a location fluidly between aftercooler 44 and intake manifold 24, or otherwise admitted or injected at still other locations in engine system 10.

Figure 2:
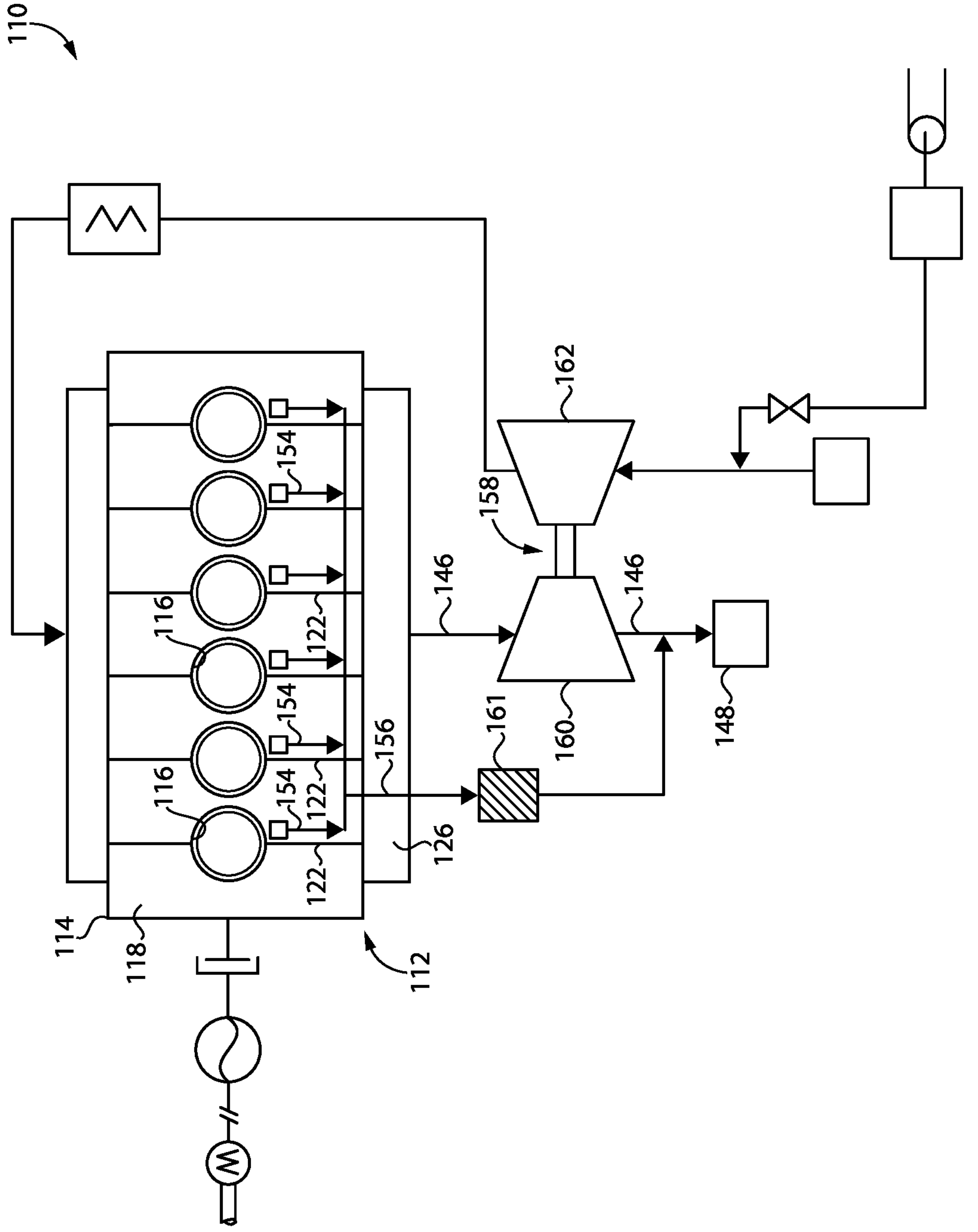
FIG. 2 is a diagrammatic view of an engine system, according to another embodiment.

Focusing now on FIG. 2, there is shown an internal combustion engine system 110 according to another embodiment and having a number of similarities to engine system 10 of FIG. 1, but certain differences. Features of engine system 110 not specifically described, or numbered, or illustrated, may be understood to be generally analogous to those of engine system 10 discussed herein except where otherwise indicated or apparent from the context. Engine system 110 includes an engine 112 having a cylinder block 114 with cylinders 116 therein, and a cylinder head 118 attached to cylinder block 114. Cylinder head 118 includes exhaust ports 122, fluidly connected to an exhaust manifold 126. An engine exhaust conduit 146 extends from exhaust manifold 126 to an exhaust outlet 148 by way of a turbine 160 in a turbocharger 158. Cylinder head 118 further has formed therein a plurality of exhaust collection passages 154 each fluidly connected to one of exhaust ports 122 at a UHC collection location.

Engine system 110 also includes a UHC emissions mitigation conduit 156 fluidly connected to exhaust collection passages 54. In the illustrated embodiment, UHC emissions mitigation conduit 156 fluidly connects to engine exhaust conduit 146 at a location fluidly downstream of turbine 160. Engine system 110 may also include an oxidation catalyst 161 within UHC emissions mitigation conduit 156. Oxidation catalyst 161 may be any suitable precious metal or non-precious metal oxidation catalyst, including those generally commercially available and known as a diesel oxidation catalyst or DOC. As illustrated, collected exhaust can be conveyed by way of passages 154 to a location downstream of turbine 160, and the oxidized products discharged via an exhaust stack, tailpipe, etc.

Figure 3:
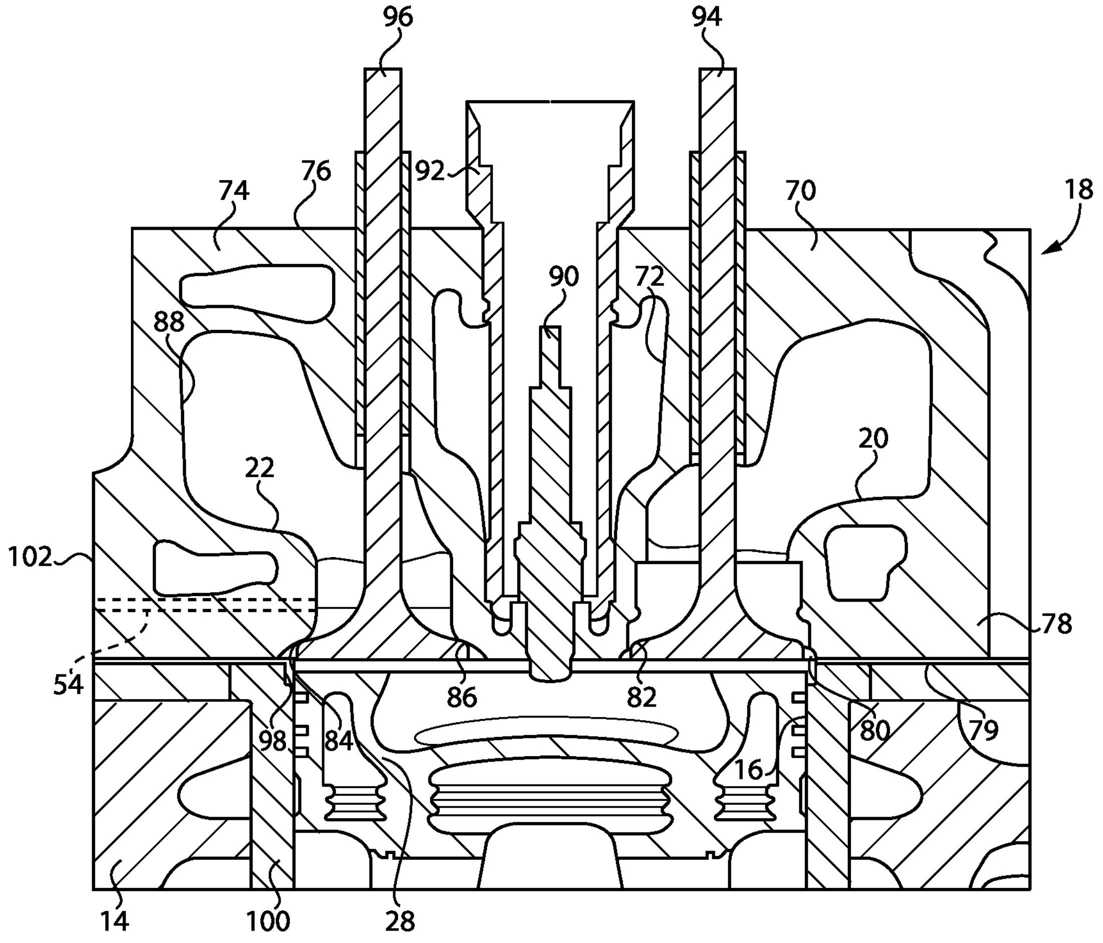
FIG. 3 is a sectioned side diagrammatic view of a portion of an engine, according to one embodiment.

Returning to the embodiment of FIG. 1, but focusing also now on FIG. 3, there are shown additional features of cylinder head 18 and associated components. Cylinder head 18 may include a metallic iron, steel, aluminum, or alloy cylinder head casting 70. Cylinder head casting 70 and cylinder head 18 are described herein, at times, interchangeably. Cylinder head casting 70 has formed therein a coolant cavity 72 extending between an upper deck 74 having an upper deck surface 76, and a lower deck 78 having a lower deck surface 79. Cylinder head casting 70 further includes an intake port 20 extending through coolant cavity 72 to an intake opening 80 in lower deck 78 forming an intake valve seat 82. Cylinder head casting 70 also includes an exhaust port 22 extending through coolant cavity 72 from an exhaust opening 84 in lower deck 78 forming an exhaust valve seat 86 to an exhaust manifold feed opening 88.

Also depicted in FIG. 3 is a sparkplug 90 within a sleeve 92 supported in cylinder head casting 70. Cylinder head 18 may also form an assembly with one or more intake valves 94 and one or more exhaust valves 96. In a typical arrangement, cylinder head casting 70 forms part of a cylinder head section associated with one cylinder and supporting two intake valves and two exhaust valves. Cylinder casting 70 could also be a so-called slab cylinder head associated with multiple cylinders. A piston 16 is shown within a cylinder liner 100 supported in cylinder block 14. A crevice 98 located adjacent to cylinder liner 100 is also shown. As further discussed herein, combustion gases occupying crevice 98 at the end of an exhaust stroke, and possibly at other locations near cylinder liner 100 may include UHC and tend to be relatively richer in UHC than other, more central areas of a cylinder where combustion tends to be occur more completely.

In a natural gas gaseous fuel engine approximately 1-2% of methane admitted to a cylinder for combustion may remain unburned resulting in so-called "methane slip" that can otherwise be discharged to atmosphere or require an expensive full-size oxidation catalyst. According to the present disclosure, approximately 5% of the engine exhaust may be collected in some embodiments. It has been discovered that by selecting the UHC collection location strategically, relatively close to the cylinder, the portion of exhaust relatively richest in UHC can be collected, and the UHC oxidized efficiently using a relatively small and inexpensive oxidation catalyst apparatus. Moreover, as the exhaust tends to be quite hot near the cylinder the oxidation of the UHC can be expected to be robust as compared to what might occur with cooler exhaust collected and/or treated further away from the engine, such as downstream of a turbocharger.

Figure 4:
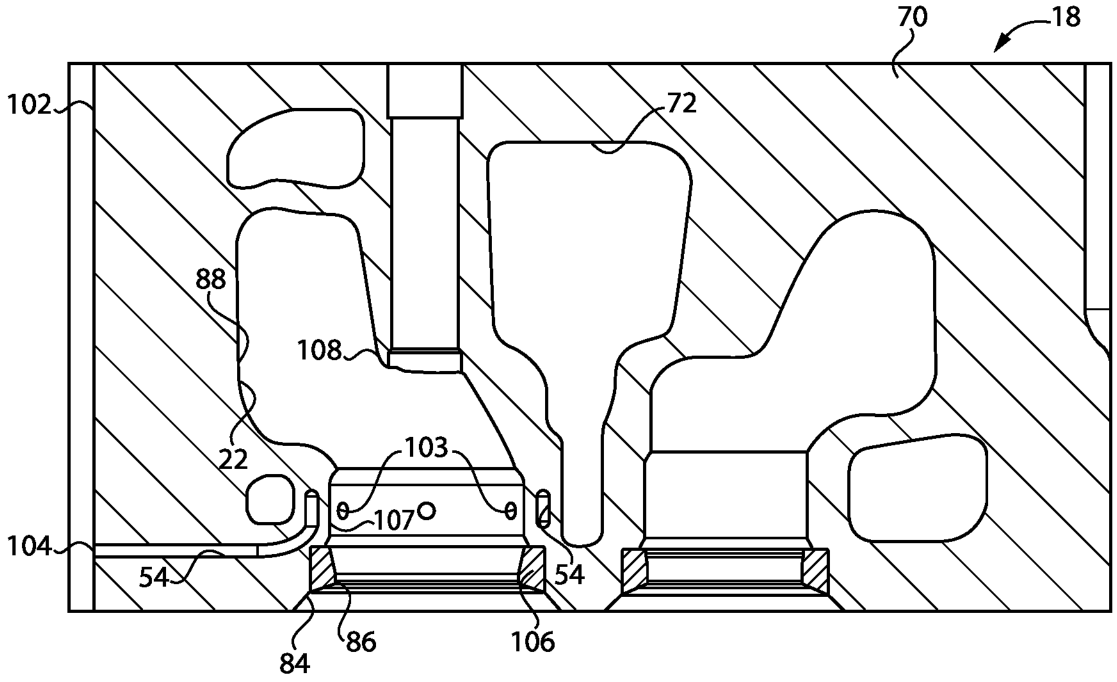
FIG. 4 is a sectioned side diagrammatic view of a cylinder head, according to one embodiment.

Focusing now on FIG. 4, there are shown still other features of cylinder head 18. Each of the plurality of exhaust ports 22 extends from exhaust valve seat 86 in cylinder head 18 to exhaust manifold feed opening 88. Each UHC collection location may be fluidly between the respective exhaust valve seat 86 and exhaust manifold feed opening 88. As can also be seen from FIG. 4, exhaust collection passage 54, and each of the plurality of exhaust collection passages 54, may include a plurality of exhaust collection inlets 103 opening to the respective exhaust port 22. Further, each of the plurality of exhaust collection passages 54 may extend circumferentially around the respective exhaust port 22. Exhaust collection inlets 103 may have a circumferential distribution around the respective exhaust port 22. In the illustrated embodiment, exhaust port 22, and analogously each of the plurality of exhaust ports 22, includes a throat 107 extending in a downstream direction away from cylinder 16 and fluidly connected to an outgoing exhaust feed cavity 108. Exhaust collection inlets 103 open to throat 107 directly. Embodiments are contemplated where a single exhaust collection inlet formed in a cylinder head feeds collected exhaust from one cylinder to an exhaust collection passage. Any number of exhaust collection inlets in any suitable arrangement might be used, together structured to feed exhaust to the respective exhaust collection passage.

It can also be noted from FIG. 4 that cylinder head casting 70 includes a lateral surface 102 extending vertically between upper deck surface 76 and lower deck surface 79. Exhaust collection passage 54 may extend horizontally through cylinder head casting 70 from the one or more exhaust collection inlets 103 to an exhaust collection outlet 104 formed in lateral surface 102.

Figure 5:
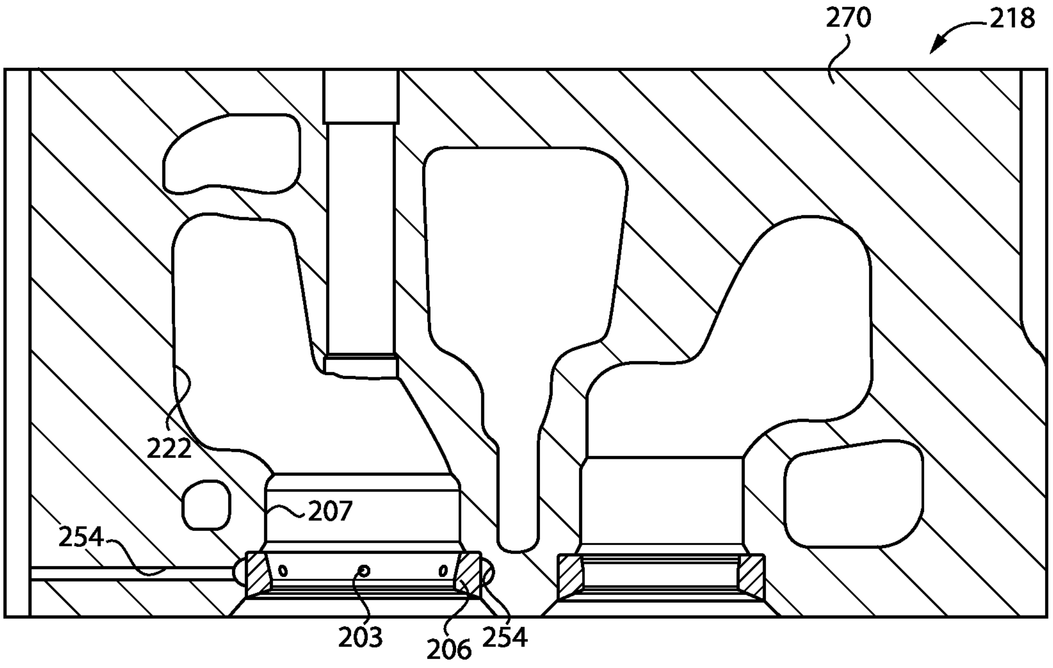
FIG. 5 is a sectioned side diagrammatic view of a cylinder head, according to another embodiment.

Referring now to FIG. 5, there is shown a cylinder head 218 including a cylinder head casting 270. An exhaust port 222 includes a throat 207 extending in a downstream direction as would be suited to conveying exhaust to an exhaust manifold from a cylinder. A valve seat insert 206 is positioned in cylinder head casting 270. An exhaust collection passage 254 extends circumferentially around valve seat insert 206, and horizontally out through cylinder head casting 270. In contrast to the embodiment of FIG. 4 where a solid valve seat insert 106 is positioned in cylinder head casting 70, in the embodiment of FIG. 5 valve seat insert 206 is perforated by way of exhaust collection inlets 203. Exhaust collection passage 254 thus fluidly connects to exhaust port 222 through valve seat insert 206.

INDUSTRIAL APPLICABILITY

Referring to the drawings generally, but focusing for description on the embodiment of FIG. 1, operating engine system 10 may include feeding a gaseous fuel, including a gaseous fuel containing gaseous hydrocarbon (HC) and air through intake conduit 40 to cylinders 16 in engine 12. As noted above, engine 12 may be operated in a conventional four-stroke engine cycle, moving piston 16 in an intake stroke, a compression stroke, a power stroke and an exhaust stroke. Moving a piston in an exhaust stroke toward a top dead center position in a cylinder will urge exhaust expelled from the cylinder via the moving of the piston through a corresponding exhaust port and into an exhaust manifold while the exhaust valve of the engine is open.

As noted above, a concentration of UHC in the bulk of the exhaust will tend to be relatively leaner. Accordingly, during a majority of the exhaust stroke the exhaust conveyed to the exhaust manifold is relatively leaner in UHC. Just prior to the end of an exhaust stroke, however, crevice volume exhaust containing some residual UHC can be expelled from the cylinder just before the exhaust valve closes. According to the present disclosure, this final amount of expelled exhaust can be relatively richer in UHC, and will tend to become trapped in the exhaust port until the next exhaust stroke absent mitigation. In a conventional strategy, the next time the exhaust valve opens this small amount of exhaust relatively rich in UHC will be conveyed on to the exhaust manifold and potentially be discharged untreated. The present disclosure, however, proposes collecting exhaust directly from the exhaust port while the exhaust valve is closed via exhaust collection passages extending through the cylinder head. According to the present disclosure, the collected exhaust can then be conveyed back into the engine by way of recirculation for combustion, oxidized in an oxidation catalyst, or treated by still another strategy.

Figure 6:
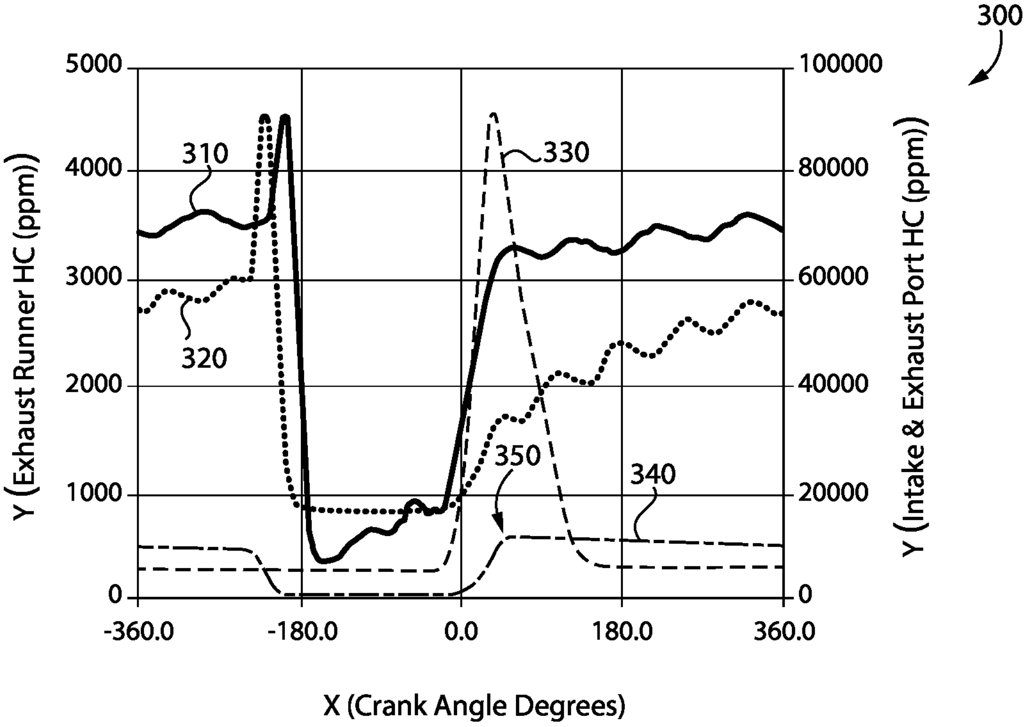
FIG. 6 is a graph illustrating unburned hydrocarbon amounts at several engine locations relative to crank angle.

Referring now to FIG. 6, there is shown a graph 300 illustrating several traces indicating UHC at different locations in an engine over a range of crank angle degrees. Trace 310 shows measured data for UHC in exhaust output from the engine. A trace 330 shows expected intake port UHC amounts, a trace 320 shows expected exhaust runner UHC amounts, and a trace 340 shows expected exhaust port UHC amounts. It can be seen that exhaust runner UHC drops low at about −180° crank angle when an exhaust stroke begins, and then rises steeply at about 0° crank angle beginning approximately when the exhaust stroke ends. Exhaust port UHC also drops approximately when an exhaust stroke begins, and then rises approximately at numeral 350 just as the exhaust stroke is ending. The exhaust port UHC then remains higher as the exhaust valve remains closed. Absent the present disclosure the UHC amount shown at approximately numeral 350 would simply remain in the exhaust port and then be conveyed on to the exhaust manifold when the exhaust valve again opens.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine system comprising:

an engine including a cylinder block having a plurality of cylinders formed therein, a cylinder head attached to the cylinder block and including a plurality of intake ports and a plurality of exhaust ports, and an intake manifold and an exhaust manifold each attached to the cylinder block;

the cylinder head further having formed therein a plurality of exhaust collection passages each fluidly connected to one of the plurality of exhaust ports at an unburned hydrocarbon (UHC) collection location;

an engine exhaust conduit fluidly connected to the exhaust manifold; and a UHC emissions mitigation conduit fluidly connected to the plurality of exhaust collection passages;

each of the plurality of exhaust ports extending from an exhaust valve seat in the cylinder head, to an exhaust manifold feed opening, and each UHC collection location being fluidly between the respective exhaust valve seat and exhaust manifold feed opening.

2. The engine system of claim 1 further comprising a turbocharger including a turbine within the engine exhaust conduit, and a compressor, and the UHC emissions mitigation conduit fluidly connects to the engine exhaust conduit at a location fluidly downstream of the turbine.

3. The engine system of claim 2 further comprising an oxidation catalyst within the UHC emissions mitigation conduit.

4. The engine system of claim 1 further comprising an intake conduit, and a turbocharger including a turbine within the engine exhaust conduit and a compressor within the intake conduit, and the UHC emissions mitigation conduit fluidly connects to the intake conduit at a location fluidly upstream of the compressor.

5. The engine system of claim 1 further comprising an electrically actuated valve within the UHC emissions mitigation conduit and movable between an open position, and a closed position.

6. The engine system of claim 1 wherein each of the plurality of exhaust collection passages includes a plurality of exhaust collection inlets opening to the respective exhaust port.

7. The engine system of claim 6 wherein each of the plurality of exhaust collection passages extends circumferentially around the respective exhaust port, and each respective plurality of exhaust collection inlets has a circumferential distribution around the respective exhaust port.

8. The engine system of claim 7 wherein each of the plurality of exhaust ports includes a throat extending in a downstream direction from the respective exhaust valve seat, and each of the plurality of exhaust collection passages opens to the throat of the respective exhaust port.

9. A cylinder head for an engine comprising:

a cylinder head casting having formed therein a coolant cavity extending between an upper deck having an upper deck surface, and a lower deck having a lower deck surface;

the cylinder head casting further including an intake port extending through the coolant cavity to an intake opening in the lower deck forming an intake valve seat, and an exhaust port extending through the coolant cavity from an exhaust opening in the lower deck forming an exhaust valve seat to an exhaust manifold feed opening; and the cylinder head casting further having formed therein an exhaust collection passage fluidly connected to the exhaust port at an unburned hydrocarbon (UHC) collection location vertically between the upper deck and the lower deck, and fluidly between the respective exhaust valve seat and manifold feed opening.

10. The cylinder head of claim 9 wherein the cylinder head casting includes a lateral surface extending vertically between the upper deck surface and the lower deck surface, and the exhaust collection passage extends horizontally through the cylinder head casting from an exhaust collection inlet to an exhaust collection outlet in the lateral surface.

11. The cylinder head of claim 9 wherein the exhaust inlet is one of a plurality of exhaust inlets having a circumferential distribution around the exhaust port, and the exhaust collection passage extends circumferentially around the exhaust port.

12. The cylinder head of claim 9 wherein the exhaust port includes a throat, and the UHC collection location is within the throat.

13. The cylinder head of claim 9 further comprising a valve seat insert forming the exhaust valve seat, and the exhaust collection passage fluidly connects to the exhaust port through the valve seat insert.

14. An engine system comprising:

an engine including a cylinder block having a plurality of cylinders formed therein, a cylinder head attached to the cylinder block and including a plurality of intake ports and a plurality of exhaust ports, and an intake manifold and an exhaust manifold each attached to the cylinder block;

the cylinder head further having formed therein a plurality of exhaust collection passages each fluidly connected to one of the plurality of exhaust ports at an unburned hydrocarbon (UHC) collection location;

an engine exhaust conduit fluidly connected to the exhaust manifold; and a UHC emissions mitigation conduit fluidly connected to the plurality of exhaust collection passages;

each of the plurality of exhaust collection passages including a plurality of exhaust collection inlets opening to the respective exhaust port; and each of the plurality of exhaust collection passages extending circumferentially around the respective exhaust port, and each respective plurality of exhaust collection inlets having a circumferential distribution around the respective exhaust port.

15. The engine system of claim 14 wherein each of the plurality of exhaust ports includes a throat extending in a downstream direction from the respective exhaust valve seat, and each of the plurality of exhaust collection passages opens to the throat of the respective exhaust port.

* * * * *